United States Patent
Logunov

(10) Patent No.: US 12,344,552 B2
(45) Date of Patent: Jul. 1, 2025

(54) SPACER AND METHODS FOR OPTIMIZING OPTICAL FIBER CURING PROCESS

(71) Applicant: CORNING INCORPORATED, Corning, NY (US)

(72) Inventor: Stephan Lvovich Logunov, Corning, NY (US)

(73) Assignee: Corning Incorporated, Corning, NY (US)

( * ) Notice: Subject to any disclaimer, the term of this patent is extended or adjusted under 35 U.S.C. 154(b) by 479 days.

(21) Appl. No.: 17/952,713

(22) Filed: Sep. 26, 2022

(65) Prior Publication Data

US 2023/0111564 A1      Apr. 13, 2023

Related U.S. Application Data

(60) Provisional application No. 63/253,608, filed on Oct. 8, 2021.

(51) Int. Cl.
    *C03C 25/104*      (2018.01)
    *B29C 35/08*       (2006.01)
    *C03C 25/12*       (2006.01)

(52) U.S. Cl.
    CPC ........ *C03C 25/104* (2013.01); *B29C 35/0805* (2013.01); *C03C 25/12* (2013.01)

(58) Field of Classification Search
    CPC ... C03C 25/104; C03C 25/12; B29C 35/0805; B29C 2035/0827; B29C 2035/0833; B29C 2035/0837
    See application file for complete search history.

(56) References Cited

U.S. PATENT DOCUMENTS

| | | | |
|---|---|---|---|
| 6,144,536 A | 11/2000 | Zimmerman et al. | |
| 6,190,483 B1 * | 2/2001 | Yang | B29C 35/10 |
| | | | 427/508 |
| 6,869,206 B2 | 3/2005 | Zimmerman et al. | |
| | (Continued) | | |

FOREIGN PATENT DOCUMENTS

| | | |
|---|---|---|
| EP | 1974166 B1 | 5/2016 |
| WO | 2005/114265 A1 | 12/2005 |
| WO | 2015/006593 A1 | 1/2015 |

OTHER PUBLICATIONS

Derosa et al; "Ultraviolet Cure Kinetics of Low Tg Polyurethan Acrylate Network Under Varying Light Intensity and Exposure Time"; Progress in Organic Coatings; 158, (2021) 106353; 10 Pages.

*Primary Examiner* — David E Smith
(74) *Attorney, Agent, or Firm* — Amy T. Lang

(57) ABSTRACT

A curing apparatus for curing a coating composition disposed on an optical fiber, the curing apparatus including a first light source and a second light source such that the second light source is spaced from the first light with a gap. The curing apparatus further including a first reflector and a second reflector such that the second reflector is spaced from the first reflector with the gap. Furthermore, a spacer is disposed within the gap, the spacer being formed of a material configured to reflect at least about 90% of light emitted from the first light source and from the second light source, and incident on the spacer, to an optical fiber such that the reflected light has sufficient intensity to cure a coating on the optical fiber.

20 Claims, 6 Drawing Sheets

(56) References Cited

U.S. PATENT DOCUMENTS

| | | | |
|---|---|---|---|
| 7,322,122 B2* | 1/2008 | Overton | B05D 3/0209 |
| | | | 34/61 |
| 7,722,211 B2 | 5/2010 | Marra et al. | |
| 8,604,448 B2* | 12/2013 | Hartsuiker | B05D 3/067 |
| | | | 250/493.1 |
| 8,854,734 B2 | 10/2014 | Ingram | |
| 2006/0239006 A1 | 10/2006 | Chaves et al. | |
| 2014/0091230 A1 | 4/2014 | Clark et al. | |
| 2015/0285994 A1* | 10/2015 | Okada | C03C 25/104 |
| | | | 65/382 |
| 2020/0192024 A1 | 6/2020 | Logunov | |
| 2021/0032160 A1* | 2/2021 | Bookbinder | C03C 25/1065 |
| 2022/0089480 A1* | 3/2022 | Billings | C03C 25/104 |

* cited by examiner

SPACER AND METHODS FOR OPTIMIZING OPTICAL FIBER CURING PROCESS

This application claims the benefit of priority to U.S. Provisional Patent Application Ser. No. 63/253,608 filed on Oct. 8, 2021, the content of which is relied upon and incorporated herein by reference in its entirety.

FIELD

The present specification generally relates to a spacer and methods of optimizing an optical fiber curing process. More specifically, the present specification relates to a spacer and methods of optimizing the curing process of a coating applied to an optical fiber.

BACKGROUND

The light transmitting performance of an optical fiber is highly dependent upon the properties of the polymer coating that is applied to the fiber during manufacturing. Typically, a dual-layer coating is applied to the fiber, where a relatively softer inner coating is in contact with the fiber and relatively harder outer coating surrounds the inner coating. The outer coating allows the fiber to be handled and further processed, while the inner coating plays a key role in dissipating external forces and preventing them from being transferred to the fiber, where they can cause microbend induced light attenuation.

Polymer coatings are applied to the optical fibers as the fibers are drawn. More specifically, liquid coatings are applied to the surface of the fibers as they are drawn within a draw tower. The liquid coatings are then cured using a plurality of light sources. Because the fibers travel within the draw tower at high speeds, the light sources must be able to cure the liquid coatings very quickly and efficiently as they fiber travels within the draw tower.

SUMMARY

Optical fibers may travel at such high speeds of about 50 m/s or greater within a draw tower. Therefore, the light sources must be able to not only quickly and efficiently cure the liquid coating on the fiber but must also be able to provide uniform exposure and curing. Light-emitting diodes (LEDs) have recently been used as the preferred light source to cure such liquid coatings. However, any gaps or spacing between adjacent light sources can lead to areas within the draw tower in which the fiber is not illuminated. Such can then lead to uneven exposure or increased exposure time. Even though such gaps or spacing may be very small, the effects of even small gaps and spacings can accumulate when multiple light sources are stacked within a draw tower. Thus, the overall effect of the gaps and spacings becomes significant.

Accordingly, there is a need to optimize the curing process of an optical fiber. Embodiments of the present disclosure include a spacer disposed in the gaps between adjacent light sources to increase the intensity of curing light directed from the light sources to the optical fiber. Thus, the spacers disclosed herein reduce the exposure time and provide a more even exposure to cure a coating on an optical fiber. The spacers may be comprised of partially sintered silica soot, as discussed further below.

A first aspect of the present disclosure includes a curing apparatus for curing a coating composition disposed on an optical fiber, the curing apparatus comprising a first light source and a second light source such that the second light source is spaced from the first light with a gap. The curing apparatus further comprising a first reflector and a second reflector such that the second reflector is spaced from the first reflector with the gap. Furthermore, a spacer is disposed within the gap, the spacer being formed of a material configured to reflect at least about 90% of light emitted from the first light source and from the second light source, and incident on the spacer, to an optical fiber such that the reflected light has sufficient intensity to cure a coating on the optical fiber.

A second aspect of the present disclosure includes a curing apparatus for curing a coating composition disposed on an optical fiber, the curing apparatus comprising a first light source and a second light source such that the second light source is spaced from the first light with a gap. The curing apparatus further comprising a first reflector and a second reflector such that the second reflector is spaced from the first reflector with the gap. Furthermore, a spacer is disposed within the gap, the spacer comprising partially sintered silica soot with a density in a range from about 0.8 g/cm$^3$ to about 1.9 g/cm$^3$.

A third aspect of the present disclosure includes a method of curing a coating on an optical fiber, the method comprising directing a glass fiber through a first reflector and through a second reflector such that the first reflector reflects light from a first light source to an optical fiber and the second reflector reflects light from a second light source to the optical fiber, the optical fiber comprising a coating thereon. The method further comprises reflecting with a spacer at least about 90% of the light from the first light source and from the second light source, and incident on the spacer, to the optical fiber, the spacer being disposed within a gap between the first reflector and the second reflector. Furthermore, the reflected light from the first reflector, the second reflector, and the spacer cures the coating on the optical fiber.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
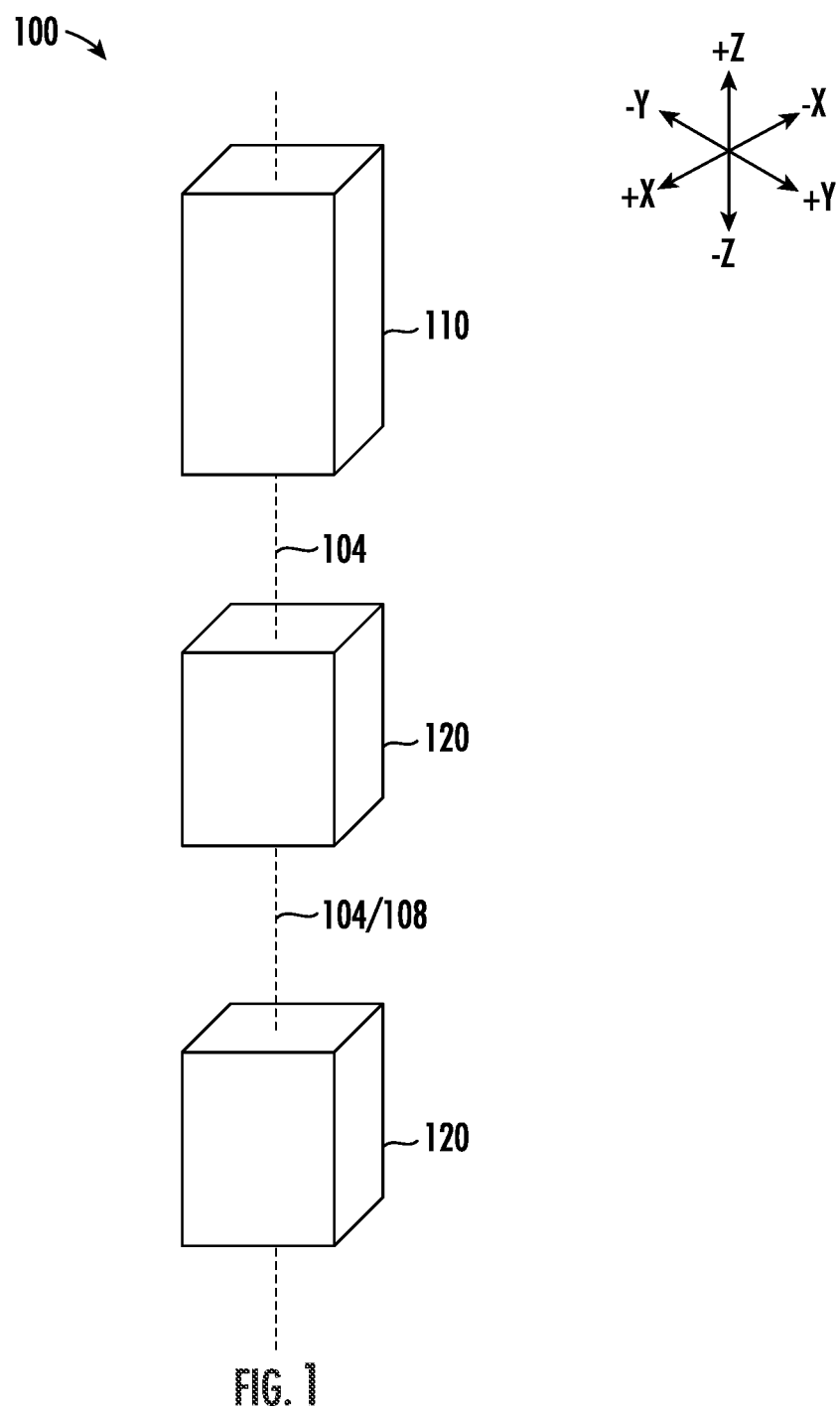
FIG. 1 schematically depicts an optical fiber forming apparatus including a curing apparatus for curing a coating, according to one or more embodiments described herein.

Reference will now be made in detail to embodiments of curing apparatuses comprising one or more spacers used to cure coating compositions applied to glass optical fibers. Whenever possible, the same reference numerals will be used throughout the drawings to refer to the same or like parts.

In this specification and in the claims which follow, reference will be made to a number of terms which shall be defined to have the following meanings:

"Include," "includes," "including", or like terms means encompassing but not limited to, that is, inclusive and not exclusive.

Directional terms as used herein—for example up, down, right, left, front, back, top, bottom—are made only with reference to the figures as drawn and the coordinate axis provided therewith and are not intended to imply absolute orientation.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

"Optical fiber" refers to a waveguide having a glass portion surrounded by a coating. The glass portion includes a core and a cladding and is referred to herein as a "glass optical fiber".

"Ultraviolet" or "UV" refers to wavelengths in the range from greater than or equal to 200 nm and less than or equal to 450 nm.

As used herein, "disposed on" means in contact with, where contact refers to direct contact or indirect contact. For example, a primary coating may be disposed on a glass optical fiber and is in direct contact with the glass optical fiber. A secondary coating is disposed on a glass optical fiber, disposed on a primary coating, in indirect contact with a glass optical fiber, and in direct contact with a primary coating. A tertiary coating is disposed on a glass optical fiber, disposed on a primary coating, disposed on a secondary coating, in indirect contact with a glass optical fiber, in indirect contact with a primary coating, and in direct contact with a secondary coating.

As used herein, the term "curable coating composition" refers to coating compositions that include one or more curable components. As used herein, the term "curable" is intended to mean that the component, when exposed to a suitable source of curing energy, includes one or more curable functional groups capable of forming covalent bonds that participate in linking the component to itself or to other components of the coating composition. The product obtained by curing a curable coating composition is referred to herein as the cured product of the composition or as a coating. The cured product may be a polymer. The curing process is induced by energy. Forms of energy include radiation or thermal energy. In embodiments, curing occurs with radiation, where radiation refers to electromagnetic radiation. Curing induced by radiation is referred to herein as radiation curing. A radiation-curable component is a component that can be induced to undergo a curing reaction when exposed to radiation of a suitable wavelength at a suitable intensity for a sufficient period of time. Suitable wavelengths include wavelengths in the infrared, visible, or ultraviolet portion of the electromagnetic spectrum.

A curable component includes one or more curable functional groups. Preferred curable functional groups include ethylenically unsaturated groups such as acrylate and methacrylate groups. Curable components include curable monomers and curable oligomers. In addition to curable monomers and/or curable oligomers, curable coating compositions typically include a photoinitiator and an additive. Additives include an adhesion promoter, a strength additive, an antioxidant, a catalyst, a stabilizer, an optical brightener, a property-enhancing additive, an amine synergist, a wax, a lubricant, and/or a slip agent. Secondary and/or tertiary coating compositions may also include a pigment.

Referring now to FIG. 1, a fiber forming apparatus 100 is schematically depicted. Fiber forming apparatus 100 includes a furnace 110, a coating apparatus 120, and a curing apparatus 130, which may all be disposed within a draw tower. Furnace 110 may be used to draw optical fiber 104. In embodiments, furnace 110 is a draw furnace that receives and heats an optical fiber preform and further includes mechanisms (such as a tensioner) for drawing optical fiber 104 from the heated optical fiber preform. Optical fiber 104 may be drawn to a desired size and shape. For example, in a continuous optical fiber manufacturing process, optical fiber 104 is drawn from a heated preform and sized to a target diameter (typically 125 µm) by furnace 110.

After optical fiber 104 is drawn from the preform, optical fiber 104 is cooled and directed to coating apparatus 120, as shown in FIG. 1. Coating apparatus 120 applies a coating 108 to optical fiber 104. In some embodiments, coating apparatus 120 is separate from furnace 110. In other embodiments, coating apparatus 120 is part of furnace 110. In the embodiment depicted in FIG. 1, optical fiber 104 is delivered to coating apparatus 120 directly from furnace 110 in a continuous fashion. In other embodiments, optical fiber 104 is delivered to coating apparatus 120 from a source other than a draw furnace, such as from a spool, in a continuous fashion (e.g. offline coating).

The material of coating 108 is applied to a surface of optical fiber 104 in a liquid state and subsequently cured in curing apparatus 130. As used herein, the term "cured" is intended to mean that the component, when exposed to a suitable source of curing energy, includes one or more curable functional groups that form covalent bonds that participate in linking the component to itself or to other components of the coating composition. The product obtained by curing a curable coating composition is referred to herein as the cured product of the composition or as a coating. The cured product is preferably a polymer. The curing process is induced by energy. Forms of energy include radiation or thermal energy. In a preferred embodiment, curing occurs with radiation, where radiation refers to electromagnetic radiation. Curing induced by radiation is referred to herein as radiation curing. A radiation-curable component is a component that can be induced to undergo a curing reaction when exposed to radiation of a suitable wavelength at a suitable intensity for a sufficient period of time. Suitable wavelengths include wavelengths in the infrared, visible, or ultraviolet portion of the electromagnetic spectrum. For purposes of the present disclosure, wavelengths in the ultraviolet (UV) spectrum are preferred.

The curable coating compositions of coating 108 include one or more functional groups. Preferred curable functional groups include ethylenically unsaturated groups such as acrylate and methacrylate groups. The curable coating compositions of coating 108 also include curable monomers and/or curable oligomers. Additionally, the curable coating compositions of coating 108 include a photoinitiator and an additive. Additives include an adhesion promoter, a strength additive, an antioxidant, a catalyst, a stabilizer, an optical brightener, a property-enhancing additive, an amine synergist, a wax, a lubricant, and/or a slip agent. The photoinitiator creates a reactive species when exposed to radiation, which initiates curing of the curable coating composition. For example, the photoinitiator is Diphenyl(2,4,6-trimethylbenzoyl)phosphine oxide (TPO).

Coating 108 may be applied to optical fiber 104 in one or more layers, such as a two-layer coating system. For example, a primary coating may be applied directly to the surface of optical fiber 104, and a secondary coating may be applied over the primary coating. In some embodiments, a tertiary coating is further applied over the secondary coating. The secondary and tertiary coatings may include the materials disclosed above along with a pigment.

In embodiments, the coating 108 is disposed as a layer on optical fiber 104 and has a thickness that is greater than or equal to 1 micron and less than or equal to 60 microns, or greater than or equal to 5 microns and less than or equal to 55 microns, or greater than or equal to 10 microns and less than or equal to 50 microns.

In embodiments that use both a primary coating and a secondary coating, two different processes may be used. In a first process (wet-on-dry process), the liquid primary coating composition is cured (e.g., via curing apparatus 130) to form a solidified primary coating, and then the liquid secondary coating is applied to the cured primary coating, for example via a separate coating apparatus (not shown). Next, the liquid secondary coating is cured using either an additional curing apparatus (similar to curing apparatus 130 as disclosed herein) or by an additional pass through curing apparatus 130. Such forms a solidified secondary coating.

In a second process (wet-on-wet process), the liquid secondary coating is applied to the liquid primary coating composition, and both liquid coatings are cured simultaneously in a single curing step within curing apparatus 130 to provide solidified primary and secondary coatings.

In embodiments, a tertiary coating may be applied to the secondary coating and cured to form a solidified coating. The tertiary coating may be an ink layer used to mark the fiber for identification purposes and may have a composition that includes a pigment. Otherwise, the composition of the tertiary coating may be similar to the composition of the secondary coating. In some embodiments, fiber forming apparatus 100 includes a tertiary coating apparatus (not depicted) disposed downstream of curing apparatus 130. The primary, secondary, and tertiary coatings can be applied and cured in a common continuous manufacturing process. In some embodiments, the primary and secondary coatings are applied and cured in a common continuous manufacturing process, the coated fiber is collected, and then the tertiary coating composition is applied and cured in a separate offline process to form the tertiary coating.

It is also noted that in some embodiments, coating apparatus 120 is separate from curing apparatus 130. In other embodiments, curing apparatus 130 is part of coating apparatus 120.

After optical fiber 104 exits curing apparatus 130, optical fiber 104 is collected and stored, which typically includes winding the fiber on a spool and storing the spool.

Figure 2:
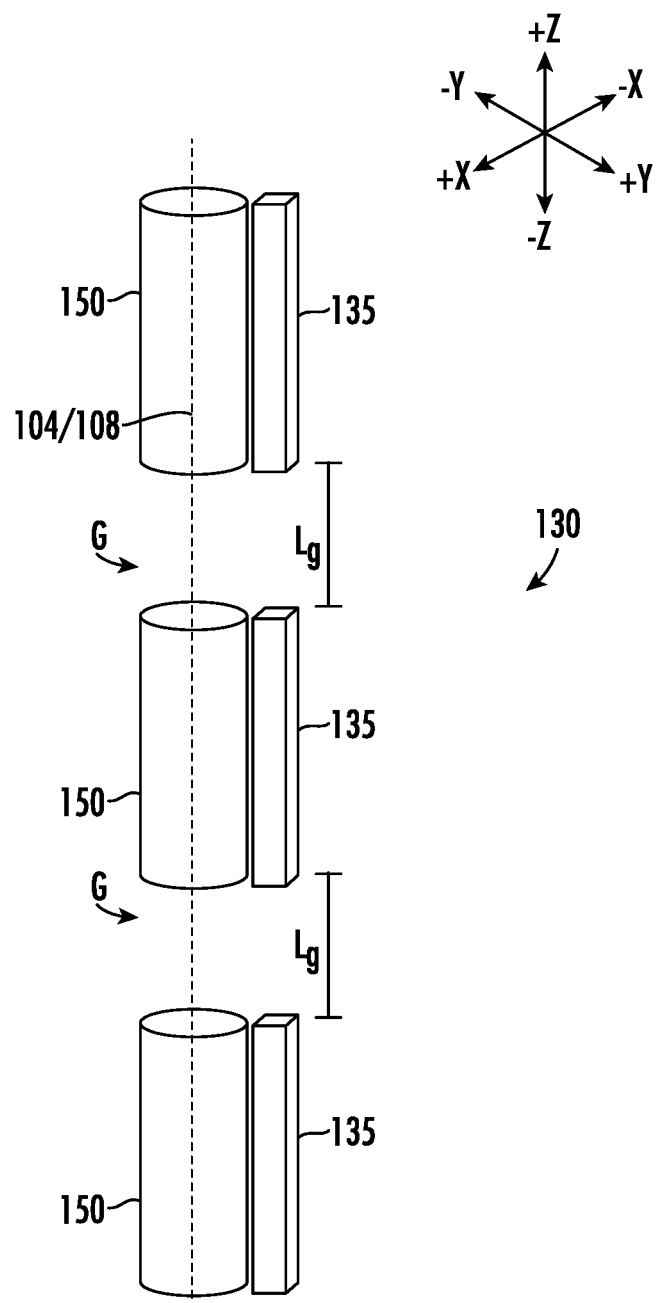
FIG. 2 schematically depicts the curing apparatus of FIG. 1, according to one or more embodiments described herein.

Referring now to FIG. 2, curing apparatus 130 comprises a plurality of light sources 135 positioned adjacent to one or more reflectors 150. Light sources 135 and reflectors 150 may each be in a stacked configuration. In the embodiment of FIG. 2, each light source 135 is associated with and disposed adjacent to a reflector 150. However, it is also contemplated that each light source 135 may be associated with and disposed adjacent to more than one reflector 150. As shown in FIG. 2, optical fiber 104 is positioned within and extends through reflectors 150 when coating 108 is cured by light sources 135. Reflectors 150 are configured to direct energy from light sources 135 to optical fiber 104. Thus, each reflector 150 is configured to redirect the curing energy from light sources 135 to cure coating 108 on optical fiber 104. Exemplary reflectors 150 include those commercially available from Phoseon Technology, Inc. Reflectors 150 may each have an annular cross-sectional shape, as shown in FIG. 2. Furthermore, reflectors 150 may each have an opening through which optical fiber 104 extends.

Reflectors 150 may each be a specular reflector or a diffuse reflector. Thus, an interior surface of each reflector 150 may be formed of or coated with a specular reflective material or a diffuse reflective material. Specular reflective materials are commonly used in mirrors. In specular reflection, the angle of reflection equals the angle of incidence. A diffuse reflective material, in contrast, is a material that reflects incident light in non-specular directions. That is, the majority of light incident to a diffuse reflective material is reflected at an angle other than the angle of incidence. In this regard, diffused reflection may be when reflection occurs at multiple angles different from specular reflection or a single angle that is the same angle as normal incident light.

A preferred mechanism of diffuse reflection is scattering, and the diffuse reflective material is also referred to herein as a scattering material. Scattering refers to redirection of light at an angle other than the angle of incidence. The scattering material applied to the interior surface of reflector 150 may scatter at least 90%, or at least 95%, or at least 97%, or at least 99%, or at least 99.5% of incident light in a wavelength range from about 200 nm to about 400 nm, or a wavelength range from about 250 nm to about 400 nm, or a wavelength range from about 300 nm to about 400 nm, or a wavelength range from about 325 nm to about 400 nm, or a wavelength range from about 350 nm to about 400 nm. In a preferred embodiment, the scattering material scatters incident light to produce reflected light having a Lambertian intensity distribution; that is, the distribution of light intensity emanating from the scattering material follows, or approximately follows, Lambert's cosine law.

The thickness of the diffuse reflective material of the embodiments disclosed herein is at least 0.5 mm, or at least 1.0 mm, or at least 5.0 mm, or at least 10.0 mm, or at least 20.0 mm, or in the range from about 0.5 mm to about 25 mm, or in the range from about 1.0 mm to about 20.0 mm, or in the range from about 5.0 mm to about 15.0 mm.

The diffuse reflective materials disclosed herein should be able to withstand moderately elevated temperatures (e.g., up to 200° C.) and should be resistant to contamination (such as outgassing from the curable coating composition as it cures) in order to provide robustness in an industrial environment. Furthermore, the diffuse reflective materials disclosed herein should have a high diffuse reflectivity in the UV spectrum. Partially sintered silica soot is a preferred diffuse reflective material for the reflectors 150 disclosed herein. Partially sintered silica soot has high diffuse reflectivity and low absorption losses over a range of wavelengths extending from 250 nm to 1900 nm. Diffuse reflectance with a reflected intensity distribution closely approximating a Lambertian distribution is achievable with partially sintered silica soot.

Optical fiber 104 may pass within and through each reflector 150 with a "draw speed" of about 35 m/s or greater, or about 40 m/s or greater or about 45 m/s or greater, or about 50 m/s or greater, or about 55 m/s or greater, or about 60 m/s or greater. In some embodiments, the draw speed is in a range from about 35 m/s to about 80 m/s, or about 40 m/s to about 75 m/s, or about 45 m/s to about 70 m/s, or about 50 m/s to about 75 m/s, or about 45 m/s to about 70 m/s, or about 50 m/s to about 60 m/s.

As discussed above, reflectors 150 are adjacent to light sources 135 so that light sources 135 cure coating 108 on optical fiber 104. Although FIG. 2 depicts three light sources 135, it is also contemplated that more or less light sources may be used, such as, for example, five or more, or six or more, or ten or more, or twenty or more. Light sources 135 may each be any light source configured to cure coating 108 on optical fiber 104. In embodiments, light sources 135 are UV lamps, such as LED lamps, or mercury lamps. For example, each light source 135 may comprise an array of LEDs. In some embodiments, the LEDs emit light at a wavelength of about 200 nm to about 400 nm, or about 250 nm to about 400 nm, or about 300 nm to about 400 nm, or about 350 nm to about 400 nm. The light sources emit curing radiation that is absorbed by the radiation-curable coating composition of coating 108 to initiate or advance a curing reaction. Preferred wavelengths for curing are wavelengths in the UV spectrum. The curing radiation from light sources 135 includes one or a plurality of wavelengths. In some embodiments, light sources 135 each include multiple LEDs and at least two of the LEDs of a single light source 135 emit at different wavelengths.

As also shown in FIG. 2, light sources 135 are positioned and stacked such that a gap G is disposed between adjacent light sources 135 and between adjacent reflectors 150. The gap G may be formed due to the housing of the light sources 135. More specifically, due to an external housing on light sources 135, the UV lamps (for example) of light sources 135 may be spaced apart by the gap G. Each gap G may have a length $L_g$ of about 25 mm or greater, or about 30 mm or greater, or about 35 mm or greater, or about 40 mm or greater, or about 45 mm or greater, or about 50 mm or greater, or about 55 mm or greater, or about 60 mm or greater, or about 70 mm or greater, or about 75 mm or greater, or about 80 mm or greater, or about 90 mm or greater, or about 100 mm or greater, or about 105 mm or greater, or about 110 mm or greater, or about 115 mm or greater, or about 120 mm or greater, or about 125 mm or greater, or about 130 mm or greater, or about 135 mm or greater. Additionally or alternatively, the length $L_g$ of gaps G may be about 135 mm or less, or about 130 mm or less, or about 125 mm or less, or about 120 mm or less, or about 115 mm or less, or about 110 mm or less, or about 105 mm or less, or about 100 mm or less, or about 95 mm or less, or about 90 mm or less, or about 85 mm or less, or about 80 mm or less, or about 75 mm or less, or about 70 mm or less, or about 65 mm or less, or about 60 mm or less, or about 55 mm or less, or about 50 mm or less. In some embodiments, the length $L_g$ is about 50.8 mm, or about 76.2 mm or about 101.6 mm, or about 127 mm. For example, the length $L_g$ may be in a range from about 50.8 mm to about 127 mm. It is also noted that the gaps G between different light sources 135 may be the same or different from each other.

Figure 3:
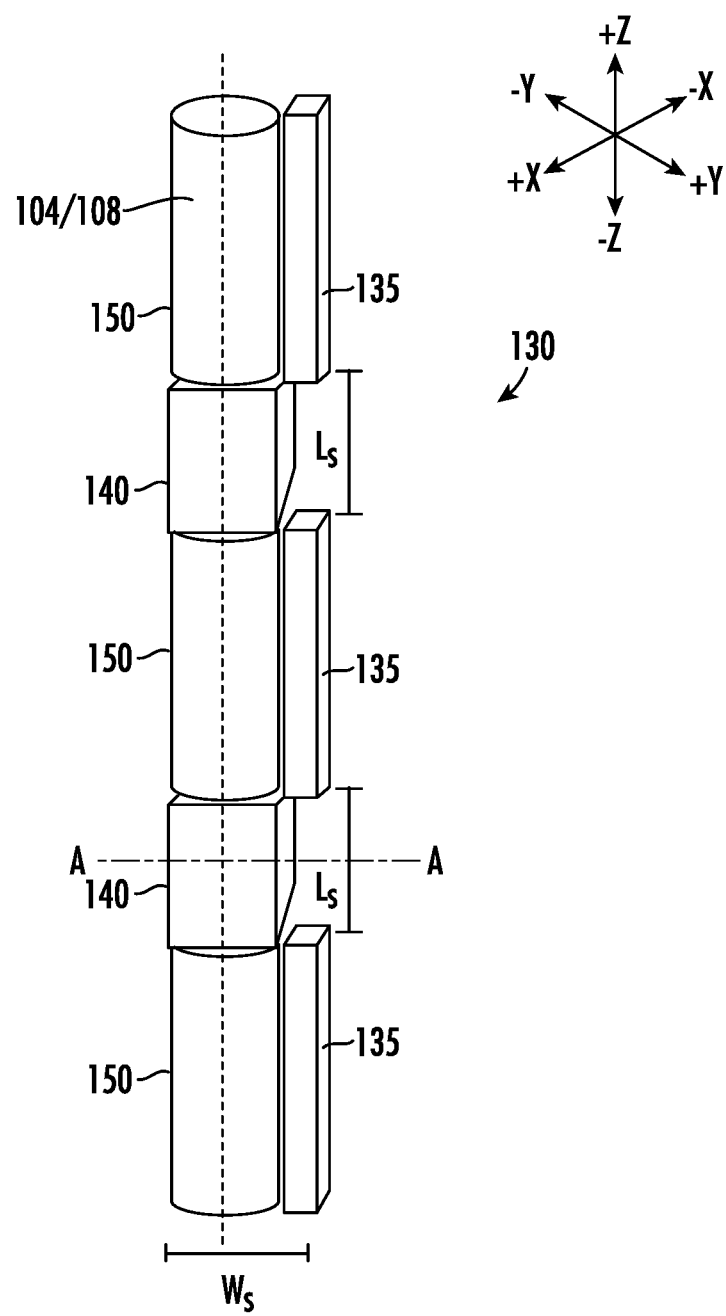
FIG. 3 schematically depicts another image of the curing apparatus of FIG. 1, according to one or more embodiments described herein.

The gaps G between adjacent light sources 135 and adjacent reflectors 150 may provide areas within fiber forming apparatus 100 in which optical fiber 104 has inconsistent and/or non-uniform curing exposure. For example, optical fibers 104 may receive reduced or no curing exposure when in these areas. Furthermore, optical fibers 104 may receive non-uniform exposure to the curing light from light sources 135 when in these areas. Thus, gaps G may not only provide inconsistent curing exposure to optical fiber 104, they may also require longer curing times. Embodiments of the present disclosure provide a spacer 140 in the gaps G between adjacent reflectors 150 and adjacent light sources 135, as shown in FIG. 3. As discussed further below, spacers 140 increase the exposure of optical fiber 104 within the areas that would otherwise have the reduced curing exposure, no curing exposure, non-uniform curing exposure, and/or inconsistent curing exposure. Thus, spacers 140 help to provide more a consistent curing exposure to optical fiber 104. Spacers 140 redirect the curing energy emitted from light sources 135 to cure coating 108 on optical fiber 104.

As shown in FIG. 3, each spacer 140 may have a length $L_s$ that fills the entire length of the gaps G. Thus, each spacer 140 may have a length $L_s$ that extends from an end of a first reflector 150 to an end of a second reflector 150. A length $L_s$ of each spacer 140 may be equal to the length $L_g$ of each gap G (as discussed above) such that one spacer 140 is disposed within and fills the entire length of each gap G. However, it is also contemplated that two or more spacers 140 may be disposed in each gap G. Therefore, in these embodiments, the length $L_s$ of spacers 140 may be less than the length $L_g$ of the gaps G. In these embodiments, the two or more spacers 140 disposed in each gap G may still fill the entire length of the gap G.

Figure 4:
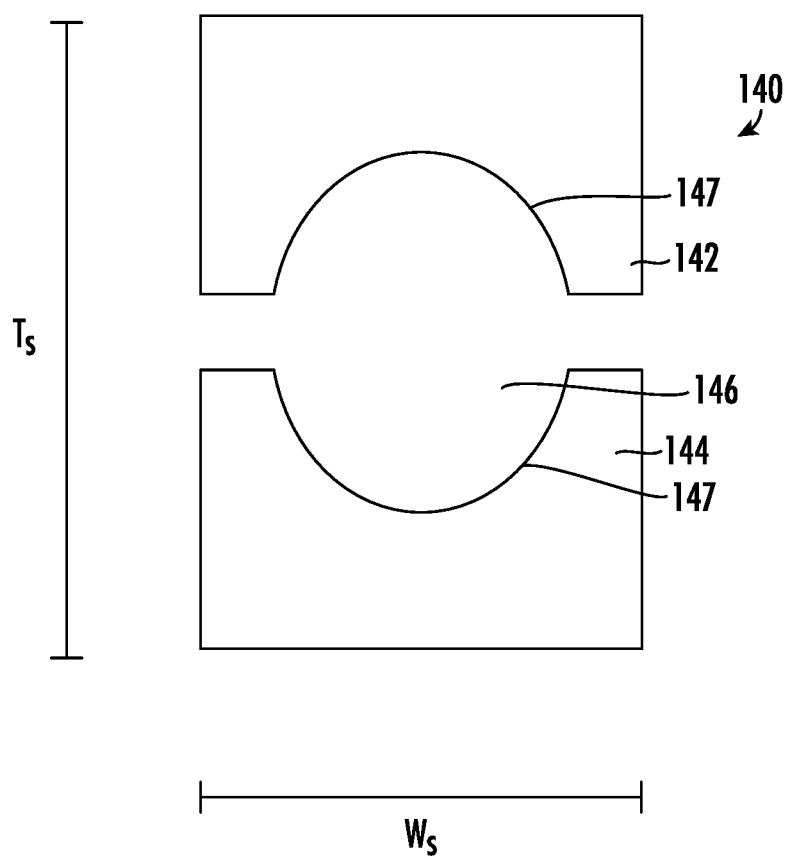
FIG. 4 depicts a spacer of the curing apparatus of FIGS. 1-3, according to one or more embodiments disclosed herein.

FIG. 4 shows a cross-sectional view of a spacer 140 extending through line A-A of FIG. 3. Spacer 140, as shown in FIG. 4, comprises a first portion 142 and a second portion 144 that form a center aperture 146 therethrough. Aperture 146 is defined by interior surfaces 147 of spacer 140. Aperture 146 may be an opening or cavity extending through spacer 140. The aperture 146 may extend the entire length $L_s$ of spacer 140 from a first end to a second end of the spacer. Optical fiber 104 may be disposed within aperture 146 during the curing of coating 108. First and second portions 142, 144 may be initially separated from each other in order to position spacer 140 within curing apparatus 130 and between adjacent reflectors 150. As shown in FIG. 4, first and second portions 142, 144 may be then be moved together such that the components are in contact with each other to a form a single spacer 140. Thus, first and second portions 142, 144 are movable with respect to each other. In some embodiments, optical fiber 104 is positioned within curing apparatus 130 before spacers 140. Therefore, first and second portions 142, 144 allow spacers 140 to be positioned around the optical fiber 104. Optical fiber 104 may be positioned at a center point of aperture 146.

A thickness $T_s$ of spacer 140 may be about 30 mm or greater, or about 35 mm or greater, or about 40 mm or greater, or about 45 mm or greater, or about 40 mm or greater, or about 45 mm or greater, or about 50 mm or greater, or about 55 mm or greater, or about 60 mm or greater. In some embodiments, the thickness $T_s$ is in a range from about 30 mm to about 60 mm, or about 35 mm to about 55 mm, or about 40 mm to about 50 mm.

A width $W_s$ of spacer 140 may be about 30 mm or greater, or about 35 mm or greater, or about 40 mm or greater, or about 50 mm or greater, or about 55 mm or greater, or about 60 mm or greater, or about 65 mm or greater, or about 70 mm or greater, or about 75 mm or greater, or about 80 mm or greater. Additionally or alternatively, the width $W_s$ may be about 80 mm or less, or about 75 mm or less, or about 70 mm or less, or about 65 mm or less, or about 60 mm or less, or about 55 mm or less, or about 50 mm or less, or about 40 mm or less, or about 30 mm or less. In embodiments, the width $W_s$ is in a range from about 30 mm to about 50 mm, or about 40 mm to about 45 mm.

In some embodiments, the thickness Ts and width $W_s$ of spacer 140 is equal to the thickness and width of the reflectors 150 and/or the thickness and width of the light sources 135 directly adjacent to the spacer. Furthermore, in some embodiments, each spacer 140 directly contacts the reflector 150 directly adjacent to that spacer.

Although FIG. 4 shows each spacer 140 as having a rectangular outer profile, each spacer 140 may comprise other shapes. For example, spacers 140 may be circular, annular, arcuate, or elliptical in shape. Similarly, although FIG. 4 shows aperture 146 as being circular in shape, aperture 146 may comprise other shapes. In some embodiments, aperture 146 is circular with a diameter of about 80 mm or less, or about 75 mm or less, or about 70 mm or less, or about 65 mm or less, or about 60 mm or less, or about 55 mm or less, or about 50 mm or less, or about 40 mm or less, or about 30 mm or less. Additionally or alternatively, the diameter of aperture 146 may be about 25 mm or greater, or about 26 mm or greater, or about 27 mm or greater, or about 30 mm or greater, or about 35 mm or greater. In some embodiments, the diameter is about 25.4 mm, or about 27 mm. In some embodiments, the diameter of aperture 146 is constant along the entire length of the aperture. Thus, the diameter of aperture 146 is constant along the entire length $L_s$ of spacer 140. In other embodiments, the diameter of 146 is non-uniform in size along its length.

It is also noted that one or more spacers 140 may have a different size and configuration from one or more other spacers 140. For example, a first spacer 140 disposed between first and second reflectors 150 may have a different length from a second spacer 140 disposed between third and fourth reflectors 150. In another embodiment, a first spacer 140 disposed between first and second reflectors 150 may have a square profile while a second spacer 140 disposed between third and fourth reflectors 150 may have a circular profile.

Spacer 140 may be formed of a material that has sufficient reflectivity to direct the curing energy (e.g., curing light) from light sources 135 towards optical fiber 104. The material of spacer 140 may also have good heat resistance to withstand the high temperatures within fiber forming apparatus 100. In some embodiments, spacer 140 is formed of silica soot. The silica soot may have an average particle diameter of about 40 nm or less, or about 35 nm or less, or about 30 nm or less, or about 25 nm or less, or about 20 nm or less, or about 15 nm or less, or about 10 nm or less. The average particle diameter, as discussed herein, was determined using a Scanning Electron Microscope (SEM). Furthermore, the silica soot may have a density of about 0.8 g/cm$^3$ to about 1.9 g/cm$^3$, or in the range from about 1.0 g/cm$^3$ to about 1.88 g/cm$^3$, or in the range from about 0.8 g/cm$^3$ to about 1.88 g/cm$^3$, or in the range from about 0.8 g/cm$^3$ to about 1.5 g/cm$^3$, or in the range from about 0.8 g/cm$^3$ to about 1.3 g/cm$^3$, or in the range from about 1.0 g/cm$^3$ to about 1.9 g/cm$^3$, or in the range from about 1.0 g/cm$^3$ to about 1.5 g/cm$^3$.

As disclosed above, spacer 140 directs the curing energy (e.g., curing light) from light sources 135 to optical fiber 104. Thus, the material of spacer 140 may be configured to reflect at least about 90% of the curing energy from light sources 135 to optical fiber 104. Stated another way, the material of spacer 140 reflects at least about 90% of the light incident on the spacer 140, which was emitted from light source 135, such that the incident light is reflected to optical fiber 104. In some embodiments, the material of spacer 140 is configured to reflect at least about 92%, or at least about 94%, or at least about 95%, or at least about 96%, or at least about 97%, or at least about 98%, or at least about 99%, or at least about 99.2%, or at least about 99.5%, or at least about 99.8%, or about 100% of the curing energy to optical fiber 104. The reflected curing energy has sufficient intensity to cure coating 108 on optical fiber 104. In some embodiments, the light incident on spacer 140 is in a wavelength range from about 200 nm to about 400 nm, or a wavelength range from about 250 nm to about 400 nm, or a wavelength range from about 300 nm to about 400 nm, or a wavelength range from about 325 nm to about 400 nm, or a wavelength range from about 350 nm to about 400 nm.

In its initial state, silica soot forms a low density (about 0.25 g/cm$^3$ to about 0.50 g/cm$^3$) porous body. Low density silica soot has high reflectivity in the UV spectrum. However, low density silica soot is fragile and mechanically unstable. To improve the mechanical integrity and machinability, low density silica soot is partially sintered to a higher density, lower porosity state. Fully sintered silica has a closed pore structure with a density greater than 1.90 g/cm$^3$. However, fully sintered silica is mechanically rigid and difficult to machine. Therefore, the preferred material for spacers 140, as disclosed herein, is partially sintered silica soot. As used herein, partially sintered silica soot refers to silica soot having a density in the above disclosed ranges.

It is also contemplated that the material of spacers 140 may be formed of silica soot particles pressed together under high pressure and into a silica soot compact. Then, the silica soot particles may be partially sintered, as discussed above. The high pressure applied to the silica soot particles may be about 100 psi or greater, or about 200 psi or greater, or about 300 psi or greater, or about 500 psi or less, or about 400 psi or less, or 300 about psi or less, or in a range from about 100 psi to about 500 psi. It is further noted that the partially sintered soot particles have the same density in the above-disclosed ranges.

In some embodiments, the partially sintered silica soot is provided as an inner layer on an interior surface of spacers 140. For example, as shown in FIG. 4, the partially sintered silica soot may be positioned on interior surfaces 147 of first and second portions 142, 144. As discussed above, interior surfaces 147 form aperture 146. In other embodiments, the partially sintered silica soot forms a monolithic body that is machined to form the body of spacers 140. Machining, for example, includes removing a portion of the monolithic partially sintered silica soot body to form first and second portions 142, 144 with the characteristics described herein.

In some embodiments, spacer 140 is formed of partially sintered silica soot particles such that there are multiple interfaces of air and silica (due to the porous nature of the sintered silica particles). Each interface contributes to refraction and partial reflection, which results in uniformly reflected and distributed light.

Silica soot can be prepared by a variety of techniques known in the art. Representative techniques include flame combustion methods, flame oxidation methods, flame hydrolysis methods, OVD (outside vapor deposition), IVD (inside vapor deposition), VAD (vapor axial deposition), double crucible methods, rod-in-tube procedures, cane-in-soot methods, and doped deposited silica processes. A variety of CVD (chemical vapor deposition) and plasma-enhanced CVD processes are known and are suitable for producing silica or doped silica.

Formation of silica soot occurs through reaction or decomposition of a silica precursor. Suitable precursors for silica include organosilanes such as OMCTS (octamethyl-cyclotetrasiloxane) and $SiCl_4$. The silica soot is optionally doped, which is accomplished with a doping precursor. The doping precursor can be introduced with the silica precursor in the deposition process or used to treat a porous soot body formed from a silica precursor. Preferred doping precursors include halogen-containing gases such as $SiBr_4$, $Cl_2$, $SiCl_4$, $Si_2Cl_6$, $Si_2OCl_6$, $CCl_4$, $F_2$, $CF_4$, and $SiF_4$.

Partially sintered silica soot is formed by heating as deposited silica soot for a sufficient period of time. The sintering temperature must be sufficient for the selected time period to induce densification of the silica soot, but not so high as to form the closed pore structure of the fully sintered state. Typical sintering temperatures are in the range from about 900° C. to about 1600° C., or in the range from about 1000° C. to about 1550° C., or in the range from about 1100° C. to about 1500° C. Typical sintering times are in the range from several minutes to several hours.

The partially sintered soot material of spacers 140 has the reflectivity, density, and average particle diameter as disclosed above. Is it also noted that reflector 150 may be comprised of the same materials as spacers 140. For example, reflector 150 may be comprised of partially sintered soot such that an inner surface of the partially sintered soot body is coated with the specular reflective material or the diffuse reflective material, as disclosed above.

Additionally, one or more spacers 140 may be comprised of a different material from one or more other spacers 140.

Figure 5:
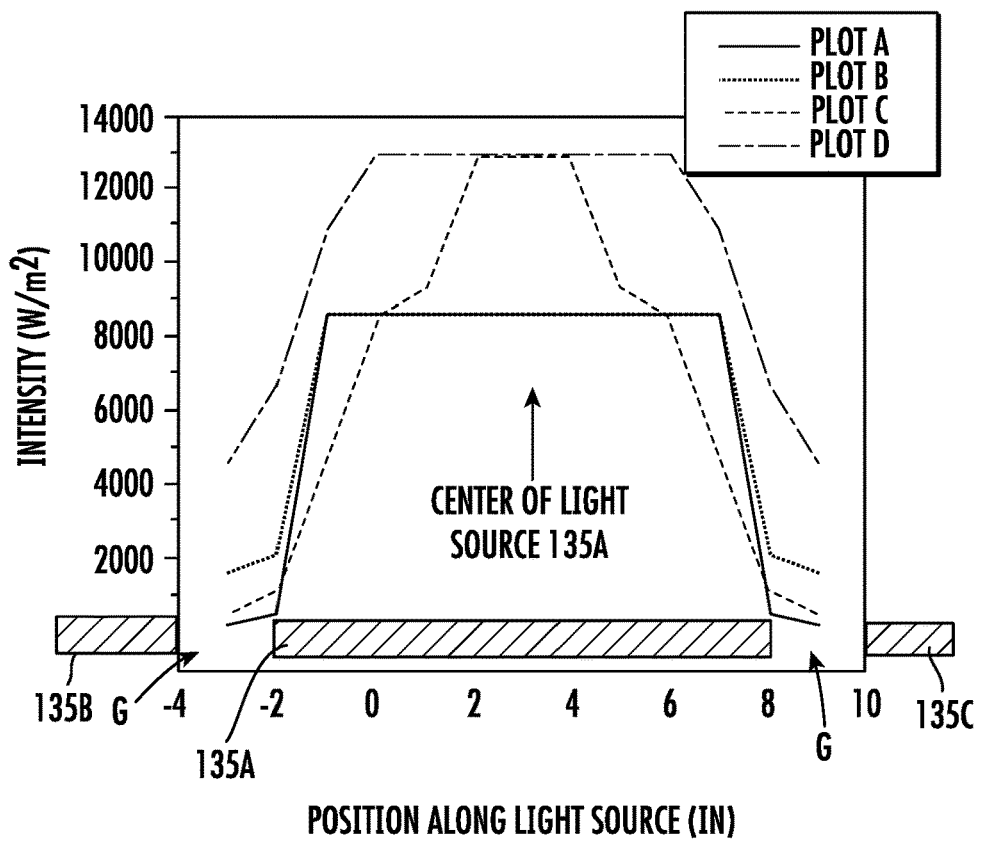
FIG. 5 depicts a plot of intensity distribution along the length of a first light source within the curing apparatus of FIGS. 1-3, according to one or more embodiments disclosed herein.

FIG. 5 shows a plot of the intensity distribution along the length of a first light source 135A within curing apparatus 130. As shown in FIG. 5, first light source 135A is disposed adjacent to a second light source 135B and to a third light source 135C such that a gap G is present between the light sources. Plot A of FIG. 5 corresponds to an assembly that includes only a specular reflector having mirror like surfaces positioned around an optical fiber 104 and disposed adjacent to first light source 135A. The specular reflector used in this example is commercially available from Phoseon Technology, Inc. and has a reflectivity greater than 90%. In particular, the specular reflector used in the example of Plot A was made from aluminum and has a partially elliptical, partially spherical cross-sectional shape. Plot B of FIG. 5 corresponds to an assembly that includes a specular reflector commercially available from Phoseon Technology, Inc. with reflectivity greater than 95% with the addition of spacers 140 disposed within the gaps G. In particular, the specular reflector used in the example of Plot B was made from aluminum and has a partially elliptical, partially spherical cross-sectional shape. As shown in FIG. 5, Plot B has a higher intensity in the regions of gaps G than Plot A due its use of spacers 140. Thus, Plots A and B show that the use of spacers 140 in gaps G increases the energy intensity applied to an optical fiber.

Plot C of FIG. 5 corresponds to an assembly that includes only a diffuse reflector positioned around optical fiber 104 and disposed adjacent to first light source 135A. The diffuse reflector is formed of partially sintered silica soot as disclosed in U.S. Publication No. 2020/0192024, which is incorporated by reference herein. In particular, the diffuse reflector used in the example of Plot C has a reflectivity above 90% and near Lambertian scattering characteristics. Plot D of FIG. 5 corresponds to an assembly that includes the same diffuse reflector with the addition of spacers 140 disposed within the gaps G. Plot D has a higher intensity in the regions of gaps G and in the peripheral regions of first light source 135A due to its use of spacers 140. Thus, FIG. 5 shows that spacers 140 within gaps G increase the intensity distribution of a light source and provide more curing energy to an optical fiber.

Additionally, FIG. 5 shows that the plots that use the diffuse reflector (Plots C and D) have a higher peak intensity distribution than the plots that use the specular reflector (Plots A and B). Thus, diffuse reflectors better distribute the curing energy from a light source than specular reflectors for purposes of curing a coating on an optical fiber. Plot D, which uses both the diffuse reflector and spacers 140, maintains the overall highest intensity distribution over the length of first light source 135A and in the regions of gaps G.

Figure 6:
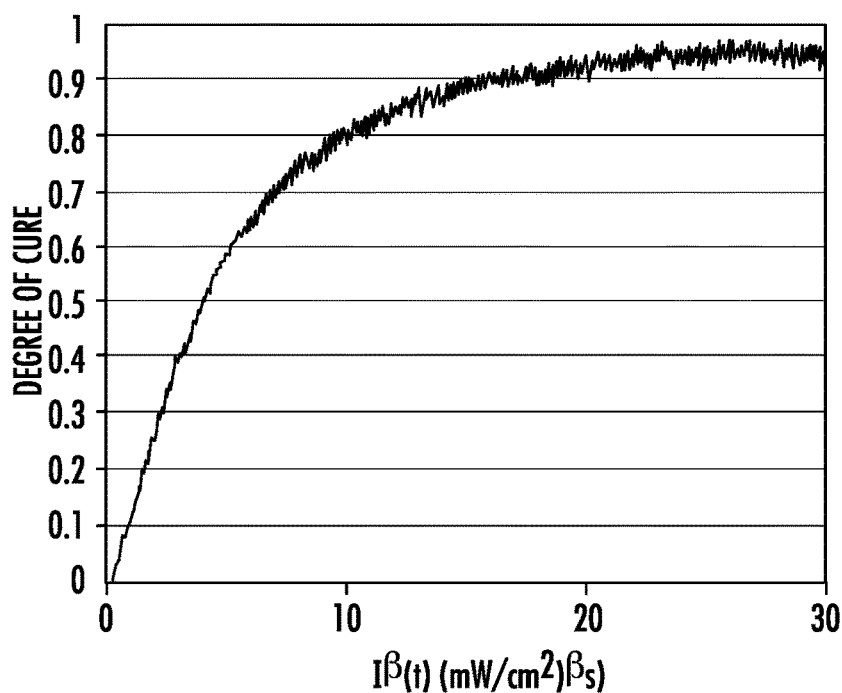
FIG. 6 depicts a plot of the energy intensity applied to an optical fiber as a function of time vs. the degree of cure using the curing apparatus of FIGS. 1-3, according to one or more embodiments disclosed herein.

FIG. 6 shows a plot of the energy intensity applied to an optical fiber as a function of time ($I^\beta(t)$) vs. the degree of cure of coating 108 on optical fiber 104, where $\beta$ is an empirical number, I is intensity, and t is exposure time. As discussed in 'Ultraviolet cure kinetics of a low Tg polyurethane acrylate network under varying light intensity and exposure time' to DeRosa et al., Progress in Organic Coatings (2021), which is incorporated by reference herein, $\beta$ is equal to 0.5. The degree of cure of coating 108 in FIG. 6 represents the degree of polymerization of coating 108 on optical fiber 104. A degree of cure approaching 1 in FIG. 6 means that coating 108 formed a solidified coating with a proper bonding network (e.g., that desired mechanical properties were achieved including a desired Young's modulus, elongation, shear strength). The degree of cure was measured using Fourier Transform Infrared Spectroscopy (FTIR).

As shown in FIG. 6, a higher energy intensity leads to a higher degree of cure of coating 108. In order to increase the energy intensity of curing apparatus 130, one can either increase the exposure time (t) or increase the intensity (I) per light source 135. FIG. 6 shows that it is more efficient to increase the exposure time (t) rather than the intensity (I). More specifically, as discussed above, the energy intensity is defined by the equation $I^\beta(t)$, where $\beta$ is 0.5. Therefore, increasing the exposure time (t) by a factor of two will also increase the energy intensity by a factor of 2. However, increasing the intensity (I) by a factor of 2 will only increase the energy intensity by a factor of the square root of 2 (because $\beta$ is equal to 0.5 so that I is raised to the power of 0.5, which is equal to the square root of I). The spacers 140 disclosed herein increase the exposure time (t) of coating 108 by increasing the amount of curing light applied to the coating.

Furthermore, it is also noted that spacers 140, when disposed within gaps G, increase both the intensity of the light sources 135 and exposure time. More specifically, spacers 140 increase the amount of curing energy applied to optical fiber 104. Thus, the use of spacers 140 within gaps G increases the energy intensity and exposure time applied to optical fiber 104, which increases the degree of cure of coating 108 on optical fiber 104.

Figure 7:
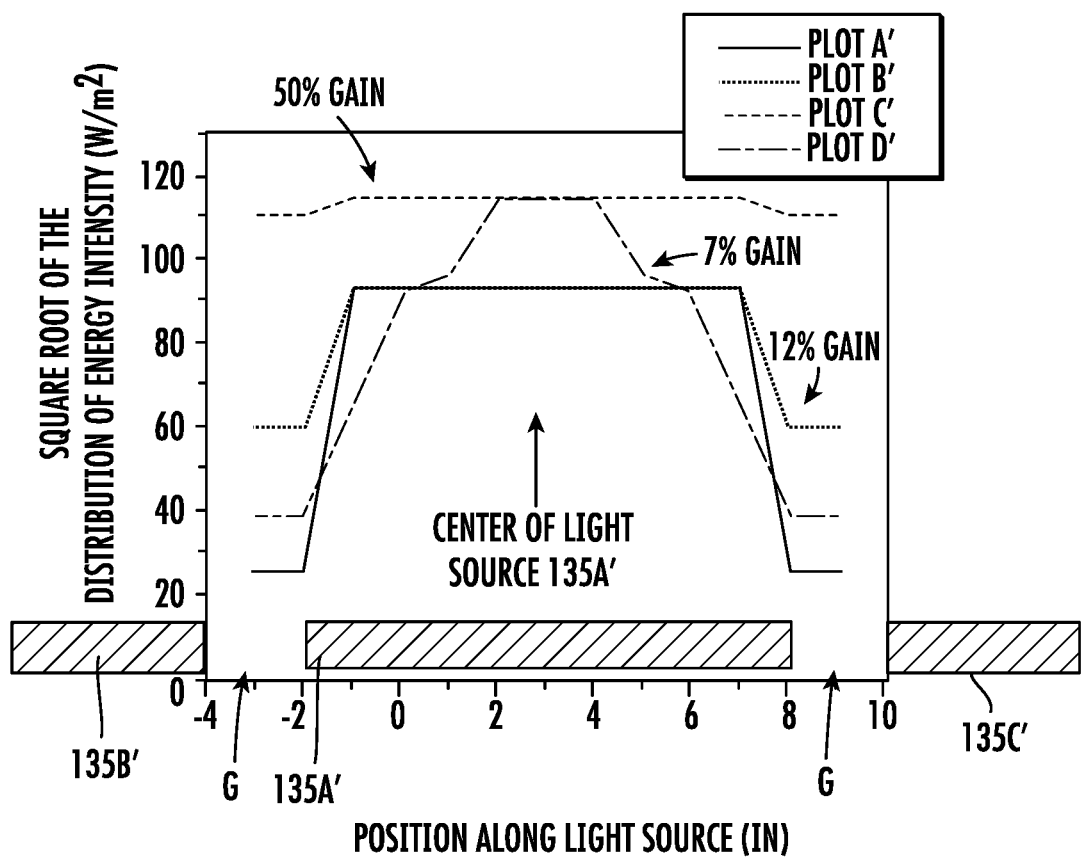
FIG. 7 depicts a plot of the square root of the distribution of energy intensity along the length of a first light source within the curing apparatus of FIGS. 1-3, according to one or more embodiments disclosed herein.

FIG. 7 shows a plot of the square root of the distribution of energy intensity (square root of I) along the length of a first light source 135A' within curing apparatus 130 (it is noted that the square root of I is plotted because β is equal to 0.5, as discussed above). As shown in FIG. 7, a first light source 135A' is disposed adjacent to a second light source 135B' and to a third light source 135C' such that a gap G is present between the light sources. Plot A' of FIG. 7 corresponds to an assembly that includes only a specular reflector having mirror like surfaces positioned around optical fiber 104 and disposed adjacent to first light source 135A'. The specular reflector used in this example is commercially available from Phoseon Technology, Inc. and has a reflectivity greater than 90%. In particular, the specular reflector used in the example of Plot A' was made from aluminum and has a partially elliptical, partially spherical cross-sectional shape. Plot B' of FIG. 7 corresponds to an assembly that includes a specular reflector commercially available from Phoseon Technology, Inc. with reflectivity greater than 95% with the addition of spacers 140 disposed within the gaps G. In particular, the specular reflector used in the example of Plot B' was made from aluminum and has a partially elliptical, partially spherical cross-sectional shape. As shown in FIG. 7, Plot B' has a higher square root of the intensity distribution in the regions of gaps G than Plot A' due its use of spacers 140. Thus, Plots A' and B' show that the use of spacers 140 in gaps G increases the energy intensity applied to an optical fiber.

Furthermore, the area under each plot in FIG. 7 is equal to the energy intensity applied to an optical fiber as a function of time ($I^β(t)$), as also discussed above with reference to FIG. 6. As shown in FIG. 7, Plot B' has a higher energy intensity $I^β(t)$ than plot A'. More specifically, plot B' was calculated to have about a 12% improvement in energy intensity $I^β(t)$ applied to the optical fiber than plot A'.

Plot C' of FIG. 7 corresponds to an assembly that includes only a diffuse reflector positioned around optical fiber 104 and disposed adjacent to first light source 135A'. The diffuse reflector is formed of partially sintered silica soot as disclosed in U.S. Publication No. 2020/0192024, which is incorporated by reference herein. In particular, the diffuse reflector used in the example of Plot C' has a reflectivity above 90% and near Lambertian scattering characteristics. Plot D' of FIG. 8 corresponds to an assembly that includes the same diffuse reflector with the addition of spacers 140 disposed within the gaps G. Plot D' has a higher intensity in the regions of gaps G and in the peripheral regions of first light source 135A' due to its use of spacers 140. Thus, FIG. 7 shows that spacers 140 within gaps G increase the intensity distribution of a light source and provide more curing energy to an optical fiber.

Additionally, FIG. 7 shows that Plot D' has a higher energy intensity $I^β(t)$ than Plot C'. More specifically, Plot D' was calculated to have about a 50% improvement in energy intensity applied to the optical fiber $I^β(t)$ relative to plot A'. In comparison, Plot C' only had a 7% improvement in energy intensity applied to the optical fiber $I^β(t)$ relative to plot A'.

FIG. 7 therefore shows that the use of spacers 140 within gaps G increases the energy intensity applied to an optical fiber when used with specular reflectors and significantly increases the energy intensity applied to an optical fiber when used with diffuse reflectors.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A curing apparatus for curing a coating composition disposed on an optical fiber, the curing apparatus comprising:
   a first light source and a second light source such that the second light source is spaced from the first light source with a gap;
   a first reflector and a second reflector such that the second reflector is spaced from the first reflector with the gap; and
   a spacer disposed within the gap, the spacer formed of a material configured to reflect at least about 90% of light emitted from the first light source and from the second light source, and incident on the spacer, to an optical fiber such that the reflected light has sufficient intensity to cure a coating on the optical fiber.

2. The curing apparatus of claim 1, wherein the material of the spacer comprises partially sintered silica soot.

3. The curing apparatus of claim 1, wherein the material of the spacer has an average particle diameter of about 40 nm or less.

4. The curing apparatus of claim 1, wherein the material of the spacer has an average particle diameter of about 30 nm or less.

5. The curing apparatus of claim 1, wherein the material of the spacer has a density in a range of about 0.8 g/cm$^3$ to about 1.9 g/cm$^3$.

6. The curing apparatus of claim 1, wherein the material of the spacer has a density in a range of about 1.0 g/cm$^3$ to about 1.88 g/cm$^3$.

7. The curing apparatus of claim 1, wherein the material of the spacer comprises partially sintered silica soot and has a density in a range of about 0.8 g/cm$^3$ to about 1.9 g/cm$^3$.

8. The curing apparatus of claim 1, wherein the first light source and the second light source each comprise a light-emitting diode that emits light at a wavelength in a range of about 200 nm to about 400 nm.

9. The curing apparatus of claim 1, wherein the spacer has a length equal to a length of the gap.

10. The curing apparatus of claim 1, wherein a length of the spacer is about 45 mm or greater.

11. The curing apparatus of claim 1, wherein a length of the spacer is about 135 nm or less.

12. The curing apparatus of claim 1, wherein a length of the spacer is in a range from about 45 nm to about 135 nm.

13. The curing apparatus of claim 1, wherein a length of the spacer is in a range from about 50.8 mm to about 127 mm.

14. The curing apparatus of claim 1, wherein the material of the spacer is sufficient to reflect at least about 95% of the light emitted from the first light source and from the second light source, and incident on the spacer, to the optical fiber.

15. The curing apparatus of claim 1, wherein the first reflector is disposed adjacent to the first light source and the second reflector is disposed adjacent to the second light source.

16. The curing apparatus of claim 1, wherein the first reflector and the second reflector are each a diffuse reflector.

17. The curing apparatus of claim 1, wherein the spacer comprises a central aperture.

18. The curing apparatus of claim 17, further comprising the optical fiber disposed within the central aperture, the optical fiber comprising an acrylate coating.

19. A curing apparatus for curing a coating composition disposed on an optical fiber, the curing apparatus comprising:
- a first light source and a second light source such that the second light source is spaced from the first light source with a gap;
- a first reflector and a second reflector such that the second reflector is spaced from the first reflector with the gap; and
- a spacer disposed within the gap, the spacer comprising partially sintered silica soot with a density in a range from about 0.8 $g/cm^3$ to about 1.9 $g/cm^3$.

20. The curing apparatus of claim 19, wherein the partially sintered silica soot has an average particle diameter of about 40 nm or less.

* * * * *